W. W. DEAN.
SPEED DETERMINING MECHANISM.
APPLICATION FILED JULY 6, 1917.

1,325,354.

Patented Dec. 16, 1919.
3 SHEETS—SHEET 1.

W. W. DEAN.
SPEED DETERMINING MECHANISM.
APPLICATION FILED JULY 6, 1917.

1,325,354.

Patented Dec. 16, 1919.
3 SHEETS—SHEET 2.

Witness

Inventor
W. W. Dean
By H. R. Van Doventer
Attorney

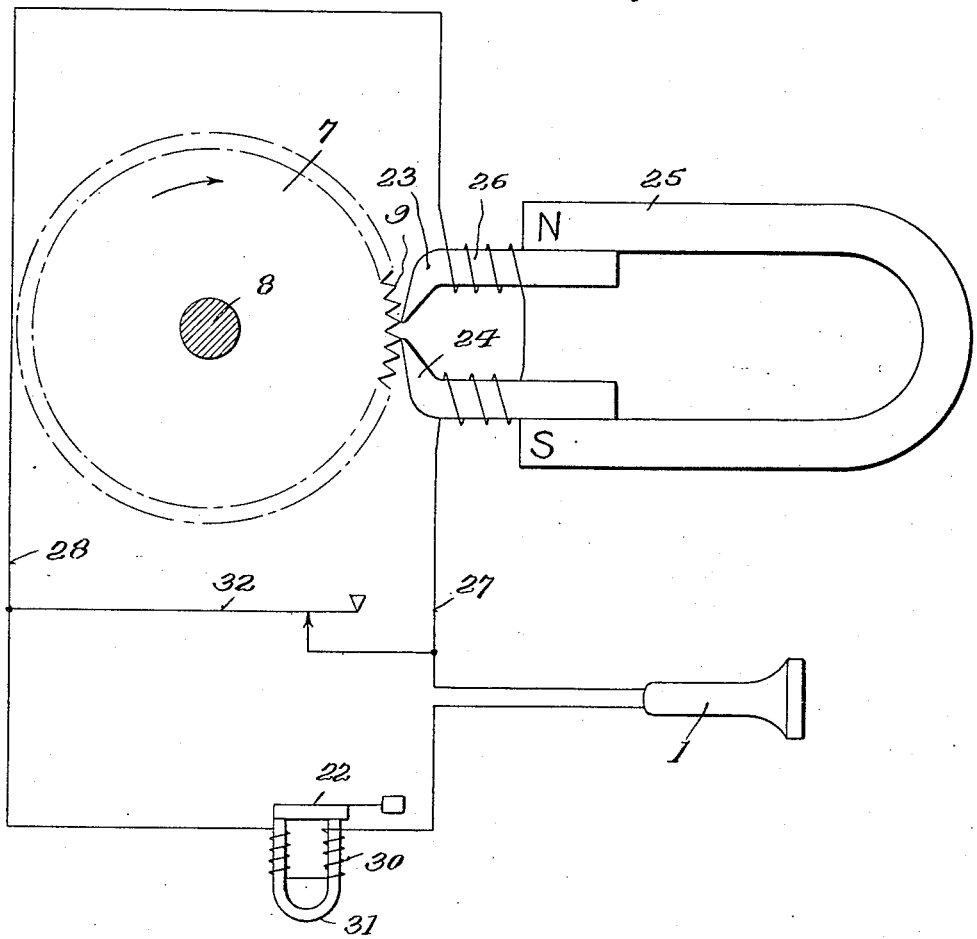

UNITED STATES PATENT OFFICE.

WILLIAM WARREN DEAN, OF STAMFORD, CONNECTICUT, ASSIGNOR TO SPLITDORF ELECTRICAL COMPANY, OF NEWARK, NEW JERSEY, A CORPORATION OF NEW JERSEY.

SPEED-DETERMINING MECHANISM.

1,325,354. Specification of Letters Patent. Patented Dec. 16, 1919.

Application filed July 6, 1917. Serial No. 179,065.

*To all whom it may concern:*

Be it known that I, WILLIAM W. DEAN, a citizen of the United States, residing at Stamford, in the county of Fairfield and State of Connecticut, have invented certain new and useful Improvements in Speed-Determining Mechanism, of which the following is a specification, reference being had to the accompanying drawing.

The invention relates to new and useful improvements in devices for obtaining a predetermined speed in a driven member, and more particularly to an electrical device for accomplishing this purpose.

An object of the invention is to provide an electrical device for obtaining a predetermined speed in a driven member by audibly comparing the frequency of electrical impulses of a predetermined nature with electrical impulses having a fixed mathematical relation to the rotative speed of the driven member.

These and other objects will in part be obvious and will in part be hereinafter more fully disclosed.

In the drawings,—

Fig. 3 is a similar view, but showing a modified form of the invention wherein the receiver is vibrated by a current produced by an inductor-alternator and including a serrated disk rotated in synchronism with the driven member and by a current produced by a magnet and vibrated standard reed.

The invention consists broadly in providing an electrical sound-producing receiver such as a telephone receiver which is connected to a circuit having a vibrated reed which operates to vary the current in the receiver, and thus produce a sound in the receiver corresponding to the vibrations of the reed. This reed is of standard character and may be, for example, adapted to produce the A-key or 435 vibrations per second.

Also in the circuit connected with the telephone receiver is a serrated disk having serrations, the number of which is mathematically determined, and this serrated disk is rotated by and in synchronism with the driven member, in which it is desired to obtain a predetermined speed. The speed of this driven member is then varied until the sound produced by this serrated member is of the same tone as the sound produced by the reed, or bears a certain predetermined relation thereto.

Figure 1:
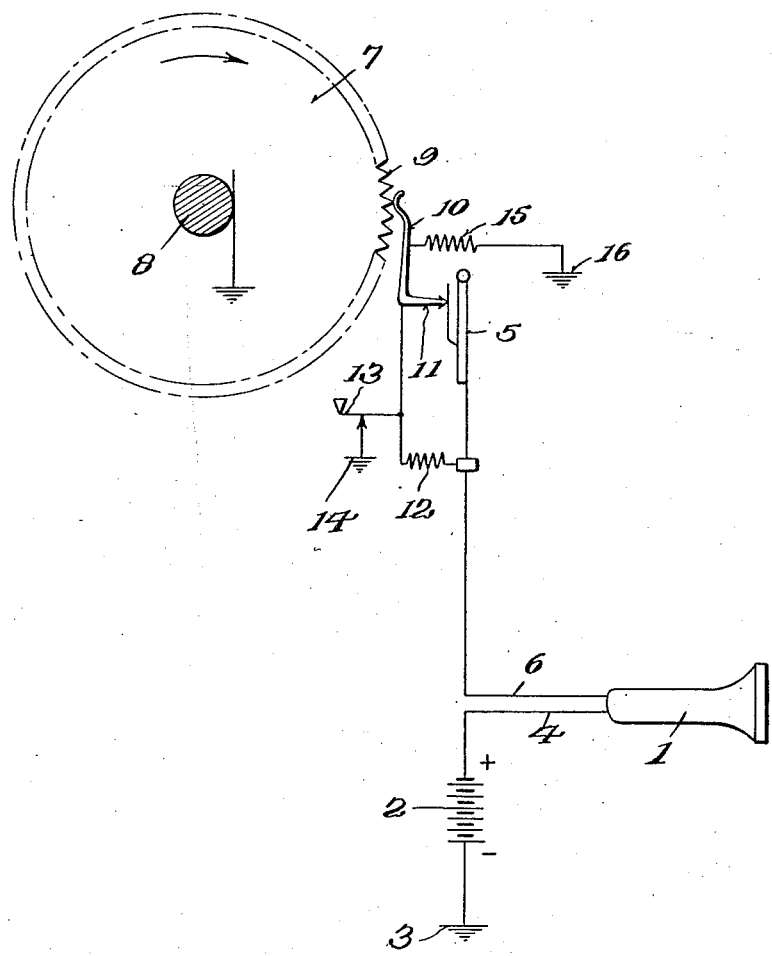
Figure 1 is a diagrammatic view showing one form of apparatus for carrying out my improvements.

Referring more in detail to the drawings, I have shown in Fig. 1 an electrical device which includes a telephone receiver indicated at 1, a battery indicated at 2, one terminal of which is grounded at 3, while the other terminal is connected to the telephone receiver through the line 4. A standard reed indicated at 5 is mounted so that it may be mechanically vibrated, and a line 6 leading from the telephone receiver connects with said reed. A wheel or disk 7 is connected to the driven member, the speed of which it is desired to regulate. This driven member as herein shown consists of a shaft 8.

This wheel 7 has a series of teeth or serrations 9 extending entirely about the periphery of the wheel. A contact arm 10 lies in the path of the extreme ends of the serrations or teeth 9. A second contact arm 11 connected with the first contact arm is adapted to be engaged by the reed 5 and as the reed vibrates, the contact between the reed and the arm 11 will be made and broken. A high resistance 12 is connected to the line 6 and through the switch 13 with the ground at 14. A second high resistance 15 is connected with the contact arms 10 and 11 and with the ground at 16.

Assuming that the reed 5 selected is a standard reed, adapted to make 435 vibrations per second, it will be understood that this reed making and breaking of the circuit will produce in the telephone receiver the A-note or key. Let us assume that shaft 8 is desired to be driven at a speed of 78 revolutions per minute, or 1.3 revolutions per second. By dividing 435 by 1.3, a result of approximately 335 is obtained. The wheel or disk 7 is provided with 335 serrations or teeth. As this wheel rotates for each rotation, the contact arm 10 will make and break the circuit 335 times per second, and if the shaft 8 is making 78 revolutions per minute, then said serrated wheel will make and break the circuit 435 times per second, and the tone produced in the telephone receiver will be the same as the A-note or tone produced by the reed 5.

The speed of the shaft 8 is capable of being adjusted. If the note produced by the serrated wheel differs from that of the note produced by the reed 5, then the speed of the shaft 8 is adjusted until these tones are the same, and thus it is determined that the speed of the shaft 8 is 78 revolutions per minute.

My improved device is especially adapted for determining the speed of a phonograph table. Under the above conditions, the shaft 8 will rotate in unison with the phonograph table. It may, however, be rotated in different ratio but in synchronism with the phonograph table, in which case the number of serrations would be changed to correspond to the reduced speed or increased speed of the shaft 8, as it may be.

By closing the switch 13, the tone produced by the serrated wheel will be cut out. Therefore, it will be apparent that the tone produced by the reed 5 may be heard alone in the receiver, or may be heard simultaneously with that of the tone produced by the serrated wheel when the switch is open. The high resistance insures that the current is never completely broken and, of course, prevents sparking at the make-and-break contacts. If the shaft 8 is to make 80 revolutions per minute, as in certain types of phonographs, then, of course, the serrations would vary in number to correspond.

The operation of the device, as shown in Fig. 1, is more specifically stated, as follows:

When the switch 13 is closed then there is a ground in the circuit between the battery and the teeth 9 on the driven wheel, so that the telephone receiver will be influenced only by the vibrated reed 5, which, of course, is picked or mechanically vibrated in any suitable way. When the switch, therefore, is closed the operator will hear only a tone in the receiver produced by the vibrating reed 5. When this switch 13 is open the circuit is not broken as the circuit is always completed, either through the resistance 12 or the resistance 15, as noted above. If the contact 11 is in engagement with the reed then the current may flow through the line 6 and through the contact 11 and the resistance 15 to ground at 16. If the engagement between the reed 5 and the contact arm 11 is broken, then the battery circuit is completed through the line 6, resistance 12 and resistance 15 to ground at 16, assuming that the arm 10 is disengaged from one of the teeth in the driven member. If, however, the arm is engaged by one of the teeth of the member 7, then the circuit is established through the member 7 to ground. In other words, the current is always flowing from the battery and this current is varied by cutting in and out the resistance. If, for example, the reed 5 is in engagement with the arm 11, then the resistance 12 is cut out. On the other hand, if the arm 10 is in engagement with the teeth 9 at the same time that the reed is in engagement with the arm 11, then the resistance 15 is cut out. If the reed 5 is vibrating it will make and break the circuit a predetermined number of times per second. If the wheel 7 is rotated it will make and break the circuit between the teeth 9 and the arm 10 a certain number of times per second, depending upon the speed of this member 7. If the speed is the proper speed, then the number of times the circuit is broken between the teeth 9 and the arm 10 will be in synchronism with the number of times the circuit is broken between the reed 5 and the arm 11. When these two are in synchronism, then the tone produced will be the same through the action of the wheel 7 as produced by the reed 5. The operator may close the switch 13 and listen to the tone produced by the reed alone and open the switch and listen to the tone produced by the reed and the rotating member 7. The operator is able to carry a tone after it ceases and compare it with another tone produced later, so that by opening and closing the switch 13, the operator can clearly compare the tone produced by the reed alone, carrying in his ear the tone produced by the combined action of the reed and the rotating member 7 and when these become the same, then the speed of the rotating wheel 7 is correctly obtained. Of course, the reed 5 may be stopped as it is mechanically vibrated and the tone produced alone by the rotating wheel 7 listened to in the receiver and compared with the tone previously produced by the reed.

Figure 2:
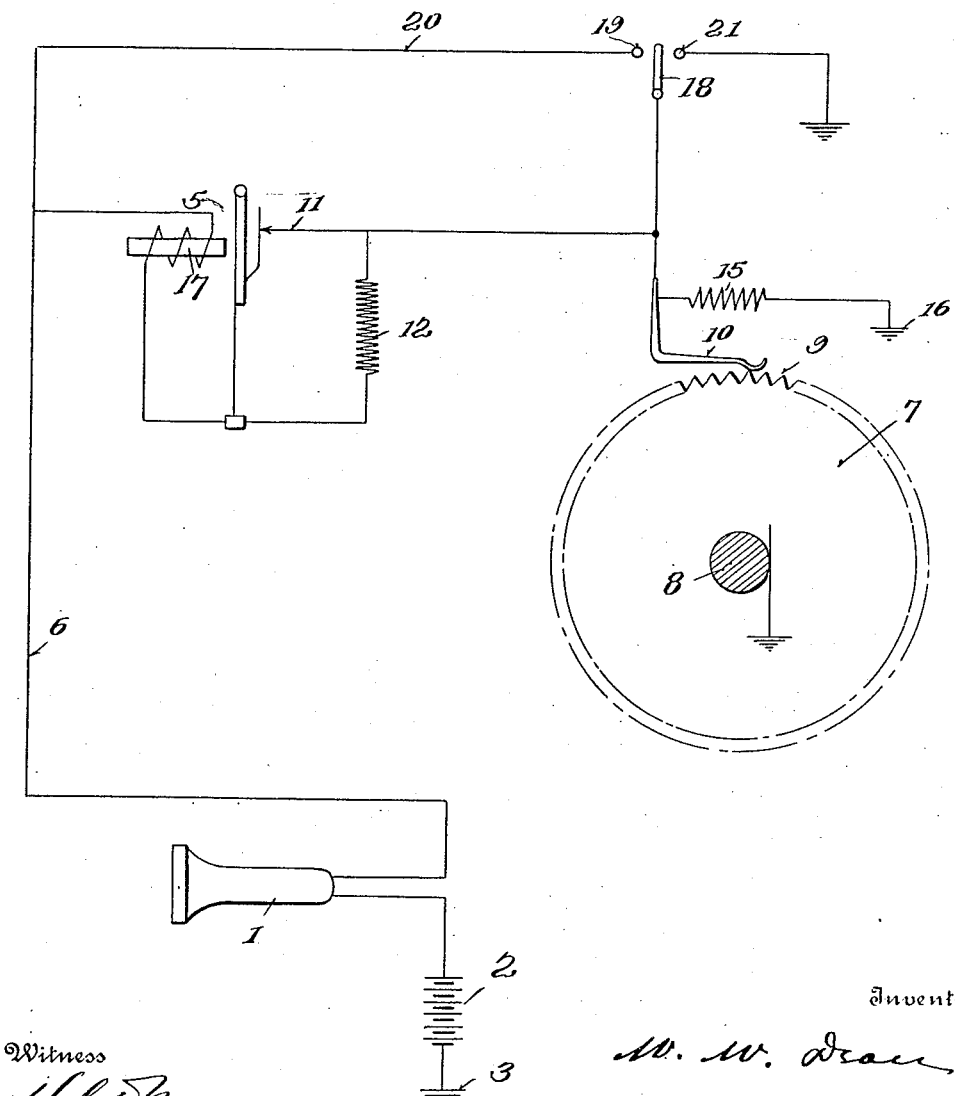
Fig. 2 is a similar view, but showing a slight modification in that the reed instead of being mechanically vibrated is electrically vibrated.

In Fig. 2 of the drawings I have shown a similar device which includes a telephone receiver 1, a battery 2 grounded at 3, a reed 5 connected by a line 6 to the telephone receiver. The line 6, however, passes about or is connected with an electromagnet 17, which vibrates the reed 5 and produces a continuous note in the receiver.

The reed 5 coöperates with a contact arm 11. The wheel 7 is provided with serrations 9, and these serrations coöperate with a contact arm 10. A resistance 15 is connected with the ground at 16 and to the contact arm 10. A resistance 12 extends across the contacts between the arm 11 and the reed 5. The wheel 7 in this instance and also in Fig. 1 is grounded.

A switch 18 is adapted to be connected with a terminal 19 and a line 20 joins the terminal 19 to the line 6. This switch may also be connected to a terminal 21 connected to the ground. When the switch is in the position shown in the drawings, then the reed and the serrated wheel 7 are both connected with the telephone receiver and will simultaneously produce sounds therein. When the switch is connected with the terminal 19, then the reed is cut out and the vibrations in the telephone receiver will be produced solely by the wheel 7. When the switch is connected with the terminal 21, then the wheel is cut out and the vibrations in the telephone receiver will be produced solely by the reed. The teeth on the wheel 7 are formed in the manner above described, and the device is used in precisely the same way.

From the above, it will be apparent that the operation of the apparatus shown in Fig. 2 is similar to that shown in Fig. 1—practically the only difference being that the reed in Fig. 2 is automatically operated instead of being mechanically vibrated, as in Fig. 1. When the switch 18 is placed on the point 21 then there is a ground established between the rotating wheel 7 and the reed 5. This cuts out the effect of the make and break of the circuit between the arm 10 and the teeth 9 of the wheel 7. When the switch 18 is on the point 21, then the operator will hear the tone in the receiver which is produced by the vibrating reed alone. When the switch 18 is on the point 19, then the reed is cut out and the operator will hear the tone in the receiver produced by the making and breaking of the circuit through the teeth and the contact arm 10. If the switch 18 is in the position shown in Fig. 2, the combined action of the reed and the rotating wheel 7 is obtained in the receiver and may be compared with the tone of the reed alone in the manner stated in connection with the description of the apparatus contained in Fig. 1.

In Fig. 3 of the drawings I have shown a further modified form. In this form of the invention, a telephone receiver 1 is used for producing electrically a sound and sound may be produced in the telephone receiver either by a vibrating reed indicated at 22 or a serrated wheel indicated at 7. The serrated wheel is formed with serrations 9, which are constructed mathematically in the manner above described.

The teeth or serrations 9 of the wheel 7 are of iron and pass successively in front of the soft iron pole pieces 23 and 24 of an inductor-alternator, which includes a permanent magnet 25. The pole pieces are provided with a winding 26, one terminal of which is connected through a line 27 to the telephone receiver and the other terminal of which is connected to a line 28. Line 28 is connected with the coil 30 extending about a permanent magnet 31, similar to the inductor-alternator, and with which the vibrating reed coöperates. A switch 32 connects the lines 27 and 28.

As the disk 7 rotates, the flux passing between the pole pieces 23 and 24 will be varied and this causes an interrupted flow of current in the coil 26. The number of variations depends upon the number of teeth in the wheel 7. The number of teeth in the wheel 7 is determined precisely in the manner above described. The vibrations of the reed 22 will also produce an interrupted flow of current in the receiver, so that the telephone receiver will respond to produce a tone determined by the number of vibrations in the reed. On closing the switch the tone produced by the rotating wheel may be cut out. When the switch is opened, both the vibrating reed and the rotating wheel will simultaneously affect the diaprhagm of the receiver. The speed of the shaft or driven member may be readily determined in the manner above described.

It is believed that the operation of the apparatus shown in Fig. 3 will be clear from the above description. The teeth 9 do not necessarily touch the pole shoes 23 and 24. They move very close to the same so that the air gap between the pole shoes and the teeth is very small and a flow of flux from the positive pole of the magnet through the pole shoes and the soft iron wheel 7 to the negative pole of the magnet is at a maximum. As soon, however, as the teeth move away from the pole shoes the length of the air gap increases. This causes the flow of flux to be very much less than when the circuit is established through the metal wheel 7 and this variation in the flow of flux from the positive to the negative poles of the magnet and through the coil 26 on the pole shoes induces a current in this coil which affects the transmitter 1. The armature 22 is not necessarily in contact with the poles of the magnet, but moves from a position very close thereto where the air gap is substantially done away with to a position at considerable distance therefrom which makes a wide air gap and this in like manner varies the flow of flux from the positive to the negative pole of the magnet 31. These elements are very common in connection with induced currents and it is thought that the operation thereof is obvious without a further detail description. If the switch 32 is closed then the effect of the rotating wheel 7 on the current induced in the coil 26 is cut out from the receiver. If the member 22 is vibrated, a tone will be produced in the receiver, depending upon the number of vibrations per second produced by this member. This member, of course, is constructed so as to produce a certain predetermined number of vibrations per second—thus a certain predetermined tone in the receiver. When the switch is open then the receiver is subject to the effect of the induced currents in the coil 26 and also in the coil 31. If the number of makes and breaks or vibrations in the flow of flux in the pole members 23 and 24 of the magnet 25 is the same as the flux vibrations in the magnet 31, then the same tone will be produced as is produced by the vibration of the member 22 alone. By adjusting the speed of the wheel 7 the tone through the combined action of the induced currents may be brought to the same tone as that produced by the vibrating member 22 alone and thus the desired speed secured.

From the above, it will be apparent that I have provided an electrical device for obtaining a predetermined speed in a driven member, which consists broadly of means for electrically producing a tone by a standard vibrating reed, which may be mechanically or electrically vibrated, and comparing this with the tone produced electrically by a rotating disk driven by and in synchronism with the driven member, which rotating disk is provided with a mathematically determined number of serrations, and these serrations are of such number as to produce the same tone as the reed when the shaft or driven member is operated at the speed desired.

It is obvious that minor changes in the details of construction and arrangement of the parts may be made, without departing from the spirit of the invention, as set forth in the appended claims.

Having thus described my invention, what I claim as new and desire to secure by Letters Patent, is:—

1. A device for obtaining a predetermined speed in a driven member, including in combination means for producing electrical impulses of a predetermined frequency, means for producing electrical impulses bearing a fixed mathematical relation to the rotative speed of the driven member, and means for audibly comparing said frequencies.

2. A device for obtaining a predetermined speed in a driven member including in combination, an electrical sound-producing receiver, a standard reed, means coöperating therewith for varying the current through the sound-producing receiver, a serrated member driven by and in synchronism with the driven member, and devices coöperating therewith for varying the current in the sound-producing receiver, whereby by comparing the sound produced by the reed and that of the serrated member a predetermined speed of the driven member may be obtained.

3. A device for obtaining a predetermined speed in a driven member, including in combination a telephone receiver, a standard reed, means coöperating therewith whereby the current in the receiver may be interrupted or varied at each vibration of said reed, a serrated wheel operated by and in synchronism with the driven member, a contact arm adapted to coöperate with said serrated wheel and so disposed relative thereto that the current in the telephone receiver is interrupted or varied as the contact arm moves from one serration to another, whereby a sound or tone may be produced in the telephone receiver by a vibrating reed and by the rotating serrated wheel.

4. A device for obtaining a predetermined speed in a driven member including in combination, a telephone receiver, a standard reed, means coöperating therewith whereby the current in the receiver may be interrupted or varied at each vibration of said reed, a serrated wheel operated by and in synchronism with the driven member, a contact arm adapted to coöperate with said serrated wheel and so disposed relative thereto that the current in the telephone receiver is interrupted or varied as the contact arm moves from one serration to another, whereby a sound or tone may be produced in the telephone receiver by the vibrating reed and by the rotating serrated wheel, and a switch disposed so as to cut out the vibrations produced in the receiver by the serrated wheel.

5. A device for obtaining a predetermined speed in a driven member including in combination, an electrical sound-producing receiver, a standard reed, means coöperating therewith for varying the current through the sound-producing receiver, a serrated member driven by and in synchronism with the driven member, devices coöperating therewith for varying the current in the sound-producing receiver, whereby by comparing the sound produced by the reed and the serrated member a predetermined speed of the driven member may be obtained, and a switch so disposed as to cut out the vibrations of the serrated wheel on the sound-producing receiver.

In testimony whereof I hereto affix my signature.

WILLIAM WARREN DEAN.